US009689777B2

(12) United States Patent
Vilar et al.

(10) Patent No.: US 9,689,777 B2
(45) Date of Patent: Jun. 27, 2017

(54) FAULT DETECTION FOR BEARINGS

(71) Applicant: DEERE & COMPANY, Moline, IL (US)

(72) Inventors: Zimin W. Vilar, Dubuque, IA (US); Chris J. Tremel, West Fargo, ND (US); Jacob Pence, Dubuque, IA (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 14/703,501

(22) Filed: May 4, 2015

(65) Prior Publication Data

US 2016/0327452 A1 Nov. 10, 2016

(51) Int. Cl.
*G01H 1/12* (2006.01)
*G01M 13/04* (2006.01)

(52) U.S. Cl.
CPC .......... *G01M 13/04* (2013.01); *G01M 13/045* (2013.01)

(58) Field of Classification Search
USPC .................. 324/139, 160, 177; 73/579, 660; 318/490
See application file for complete search history.

(56) References Cited

U.S. PATENT DOCUMENTS

| | | |
|---|---|---|
| 7,027,953 B2 | 4/2006 | Klein |
| 8,405,339 B2 | 3/2013 | Zhang et al. |
| 2002/0057750 A1* | 5/2002 | Nakao .................. H04L 27/2647 375/345 |
| 2005/0022600 A1* | 2/2005 | Hudec .................. G01M 13/04 73/579 |
| 2010/0180664 A1* | 7/2010 | Wilhelmy ............... F16C 19/52 73/7 |
| 2012/0126738 A1* | 5/2012 | Li ....................... H02P 29/0241 318/490 |
| 2013/0013138 A1 | 1/2013 | Lu et al. |

FOREIGN PATENT DOCUMENTS

| | | |
|---|---|---|
| WO | 2004059399 A2 | 7/2004 |
| WO | 2013006742 A1 | 1/2013 |

OTHER PUBLICATIONS

Mina Mashhadi Rahimian, Dissertation, Broken Bar Detection in Synchronous Machines Based Wind Energy Conversion System, Texas A&M University, Aug. 2011.

\* cited by examiner

*Primary Examiner* — Vincent Q Nguyen
(74) *Attorney, Agent, or Firm* — Lorenz & Kopf, LLP

(57) ABSTRACT

A fault detection system is disclosed for predicting bearing failure in a system with a bearing-supported shaft. A position sensor may sense a position of the shaft as the shaft rotates. A controller may receive, from the position sensor, position data indicating a plurality of sensed positions of the shaft. The controller may determine a position or velocity profile for the shaft based upon the received position data and may determine a frequency profile based upon the position or velocity profile. The controller may identify a characteristic of the frequency profile, and identify an expected bearing failure based upon the identified characteristic.

16 Claims, 6 Drawing Sheets

FAULT DETECTION FOR BEARINGS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to detection of faults in bearings, including bearings for electric and other machines.

BACKGROUND OF THE DISCLOSURE

Bearings may be used with various types of rotating machinery in order to provide for relatively smooth rotation. For example, bearings may support a shaft of an electric machine, such as a motor or generator, such that the shaft may deliver power from or to the electric machine. Bearings may also support rotating components, including other shafts, in various other applications.

Generally, bearings tend to wear during use, such that one or more parts of the bearing may eventually fail. Depending on the character of use and wear, various parts of a bearing may be subject to failure, including inner and outer races, rolling elements (e.g., balls or rollers), a bearing cage.

Unexpected failure of a bearing may prevent continuing operation of the affected device. For example, where a bearing of an electric machine fails, the electric machine may be rendered inoperable until a replacement bearing has been installed. As such, unexpected failure of bearings may lead to unexpected downtime for maintenance. Various methods are known for predicting bearing failure, such as measurement of overall vibration levels of a bearing housing, or comparison of peak vibrations with average vibrations. These methods may exhibit various deficiencies, however, including failure to detect faults sufficiently in advance of failure, failure to detect certain types of faults, failure to distinguish potential bearing failures from other system effects, and the need to install sensors (e.g., vibration sensors) that are not otherwise needed for control of the relevant system. Accordingly, it may be useful to provide a system for improved identification of expected bearing failure in advance of actual failure of a bearing.

SUMMARY OF THE DISCLOSURE

This disclosure relates to the detection of faults in bearings.

According to one aspect of the disclosure, a position sensor may sense a position of the shaft as the shaft rotates. A controller may receive, from the position sensor, position data indicating a plurality of sensed positions of the shaft. The controller may determine a position or velocity profile for the shaft based upon the received position data and may determine a frequency profile based upon the position or velocity profile. The controller may identify a characteristic of the frequency profile, such as a frequency peak, and identify an expected bearing failure based upon the identified characteristic.

In some embodiments, the shaft may be included in an electric machine, such as an electric motor. A rotor of the electric machine may be mounted to the shaft. The position sensor may be configured as a resolver or encoder. The controller may be configured as a field programmable gate array or as a microcontroller.

In some embodiments, the controller may determine the frequency profile based upon the controller determining an angular velocity profile based on the position profile or position data. The controller may identify the frequency profile characteristic, such as a frequency peak, based on solving a characteristic failure frequency-equation for a bearing supporting the shaft, or based upon comparing the frequency profile with a set of one or more predetermined failure mode frequencies. The controller may identify the expected bearing failure based upon determining that an identified frequency peak exhibits an amplitude exceeding a predetermined failure mode amplitude. The controller may communicate a notification of the expected bearing failure to an output module or a notification module.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

Figure 1:
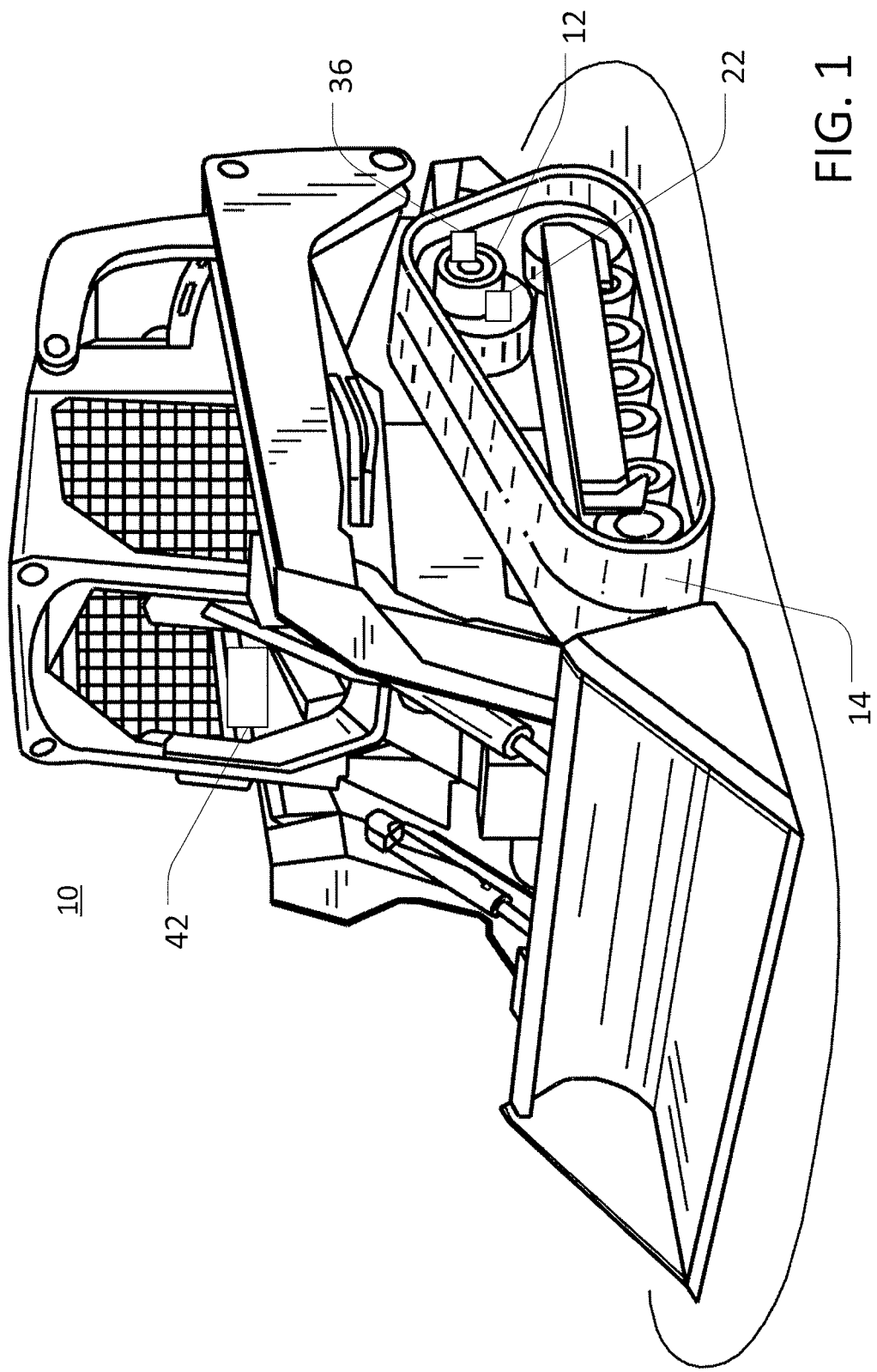
FIG. 1 is a simplified perspective view of an example machine, in the form of a compact track loader, having an electric motor.

The following describes one or more example implementations of the disclosed bearing fault detection system, as shown in the accompanying figures of the drawings described briefly above.

As used herein, unless otherwise specified or limited, a "profile" includes a set of data with multiple values, indicating a relationship between at least two variables. For example, paired location and time values in a stored two-dimensional vector, with the pairs of values collectively indicating changes (or non-changes) in spatial locations of an object over time, may be viewed as representing a position profile for the object. Similarly, paired velocity and time values in a stored velocity vector, with the pairs of values collectively indicating changes (or non-changes) in the velocity of an object over time, may be viewed as representing a velocity profile for the object.

Also as used herein, unless otherwise specified or limited, a "peak" of a profile may include a local (or absolute) maximum of the profile or a region of elevated values within the profile. For example, for a frequency profile with paired values representing frequencies and corresponding amplitudes, a "frequency peak" may include a local (or absolute) maximum amplitude, corresponding to a particular frequency, or may include a band of frequencies exhibiting elevated amplitudes with respect to frequencies adjacent to the band.

Various discussion herein may focus on example fault detection in the context of an electric motor of a work vehicle. It will be understood, however, that such discussion is presented as an example only. The disclosed fault detection system may be utilized for a variety of operations with a variety of rotating machinery.

As noted above, it may be useful to identify expected failure of a bearing, during bearing operation. Among other benefits, the disclosed fault detection system may identify expected bearing failure in advance of actual bearing failure, such that appropriate remedial, preventative, or other actions may be undertaken. Identifying an expected bearing failure, for example, may allow the scheduling of pre-emptive maintenance on the bearing, or other remedial or preventative measures, such that unplanned downtime may be avoided.

Generally, under the disclosed system, a sensor may be used to sense positions of a shaft as the shaft rotates. A frequency profile may be determined based on position data from the sensor, with the frequency profile generally representing frequency content of the position data. Analysis of the frequency profile may then indicate whether a bearing failure is expected.

A position sensor for sensing positions of a rotating shaft may be configured in various ways. In some embodiments, a sensor may be configured as a resolver (e.g., a brushless transmitted resolver), which may provide position data with sufficiently high resolution to allow relatively high resolution determination of a position profile, related velocity profile, and so on. In some embodiments, a sensor may be configured as an encoder, such as a rotary or shaft encoder. In some embodiments, a sensor (e.g., a resolver) may be configured to sense shaft position by directly measuring current positions of shaft as the shaft rotates. In some embodiments, a sensor (e.g., a resolver) may be configured to sense shaft position by measuring current positions of another component, such as a rotor or other rotating component fixed to the relevant shaft.

Generally, utilizing position data from a position sensor as a basis for bearing fault detection may provide various advantages over known approaches. For example, conventional methods may try to identify expected bearing failures for an electric motor based on sensing an electrical current for the motor and performing frequency analysis on the current. Such analysis, however, may be less accurate than analysis based on actual position data, because various system effects (e.g., frequency effects from motor components that convert the current into electro-magnetic torque and, thereby, to rotor position and speed) may somewhat decouple the frequencies of the sensed current from actual behavior of the bearing.

A frequency profile may be determined based upon position data in various ways. In some implementations, a frequency profile may be determined directly from the position data from the sensor. For example, a fast Fourier transform ("FFT") or similar algorithm may be applied to a position profile populated by the position data, in order to identify contributions of various frequencies to the position profile. In some implementations, a frequency profile may alternatively (or additionally) be determined based on a velocity profile, with the velocity profile representing, for example, the derivative of a position profile determined based on position data. An FFT or similar algorithm may then be applied to such a velocity profile, in order to identify contributions of various frequencies to the velocity profile.

Once a relevant frequency profile has been at least partly determined, analysis of the frequency profile to identify an expected bearing failure may proceed. In some implementations, identifying an expected bearing failure may be based upon identifying one or more characteristics of the frequency profile that may be indicative of an expected bearing failure. For example, a frequency profile generated by FFT processing may be analyzed in order to identify indicative frequency peaks of the profile (e.g., local maximums in amplitude, or bands of locally elevated amplitudes). The frequencies of the identified peaks may then be compared with characteristic failure mode frequencies, which may variously include single frequencies or frequency bands that are known to correspond to potential bearing failure, for the analyzed system. Appropriate correlation between a characteristic failure mode frequency and an identified frequency peak of the determined frequency profile (e.g., an overlap between a failure mode frequency and a frequency peak) may accordingly be determined to indicate an upcoming bearing failure.

Characteristic failure mode frequencies (e.g., for comparison with identified frequency peaks or other characteristics of a frequency profile) may be determined in various ways. In some implementations, a characteristic failure frequency equation may be solved, for a particular bearing arrangement and operating condition, with solutions to the equation generally indicating characteristic failure mode frequencies for the analyzed system. The identified frequency peaks or other characteristics of a determined frequency profile may be compared with the solutions of such an equation, with appropriate correlation between the characteristic failure mode frequencies and one or more characteristics of the frequency profile generally indicating the possibility of bearing failure. In some embodiments, characteristic failure mode frequencies, as determined via a characteristic failure frequency equation, may include single frequencies that are generally indicative of likely bearing failure. In some implementations, characteristic failure mode frequencies may include frequency bands spanning a range of frequencies.

A characteristic failure frequency equation may be customized for particular bearing arrangements and related systems, and may account for various factors. Some such equations, for example, may account for aspects of bearing design including bearing type (e.g., ball bearing, roller bearing, and so on), pitch diameter (e.g., a diameter along which centers of the rolling elements travel), rolling element diameter (e.g., a characteristic diameter of the rolling elements), number of rolling elements (e.g., the number of rolling elements in total, or in an individual rolling-element row), contact angle (e.g., an angle between a transverse bearing axis and the contact of the rolling element and the bearing races), and so on. In some implementations, a characteristic failure frequency equation may additionally (or alternatively) account for other variables, including system parameters such as a rated angular velocity (e.g., in RPM) for the relevant bearing application, contributions of gear boxes or other system components to an expected frequency profile of the system, and so on.

In some implementations, identified frequency peaks or other characteristics of a determined frequency profile may be compared with other parameters in order to identify an expected bearing failure. For example, known bearings (and bearing arrangements) may exhibit known characteristic mode failure frequencies, which may be stored as predetermined failure mode frequencies (e.g., predetermined single frequencies or predetermined frequency bands). Such predetermined failure mode frequencies may then be compared with identified frequency peaks or other characteristics of a determined frequency profile, with appropriate correlation between the characteristic failure mode frequencies and one or more characteristics (e.g., peaks) of the frequency profile generally indicating the possibility of bearing failure.

In some implementations, once an expected bearing failure has been identified, remedial or other operations may be undertaken. For example, once an expected bearing failure has been identified, indications of the expected failure may be communicated to various system modules. In some implementations, an indication of the expected bearing failure may be communicated to a notification module, which may be configured to provide a notification of the bearing failure to an operator, a system controller, or various other modules (e.g., motor control modules). In some implementations, an indication of the expected bearing failure may be communicated to an output module, for immediate (or later) presentation to an operator via an output device such as a display screen, indicator panel, speaker or other audio device, and so on. In this way, for example, an operator may be alerted in a timely fashion to expected bearing failures such that appropriate action may be taken.

As noted above, the disclosed system may be used in a variety of arrangements having rotating components supported by bearings. As depicted in FIG. 1, for example, the disclosed system may be used with an electric machine of a work vehicle. The work vehicle of FIG. 1 is configured as a compact track loader 10, with an electric motor 12 configured to drive the loader 10 via a track 14. In other implementations, other configurations may be possible.

Figure 2:
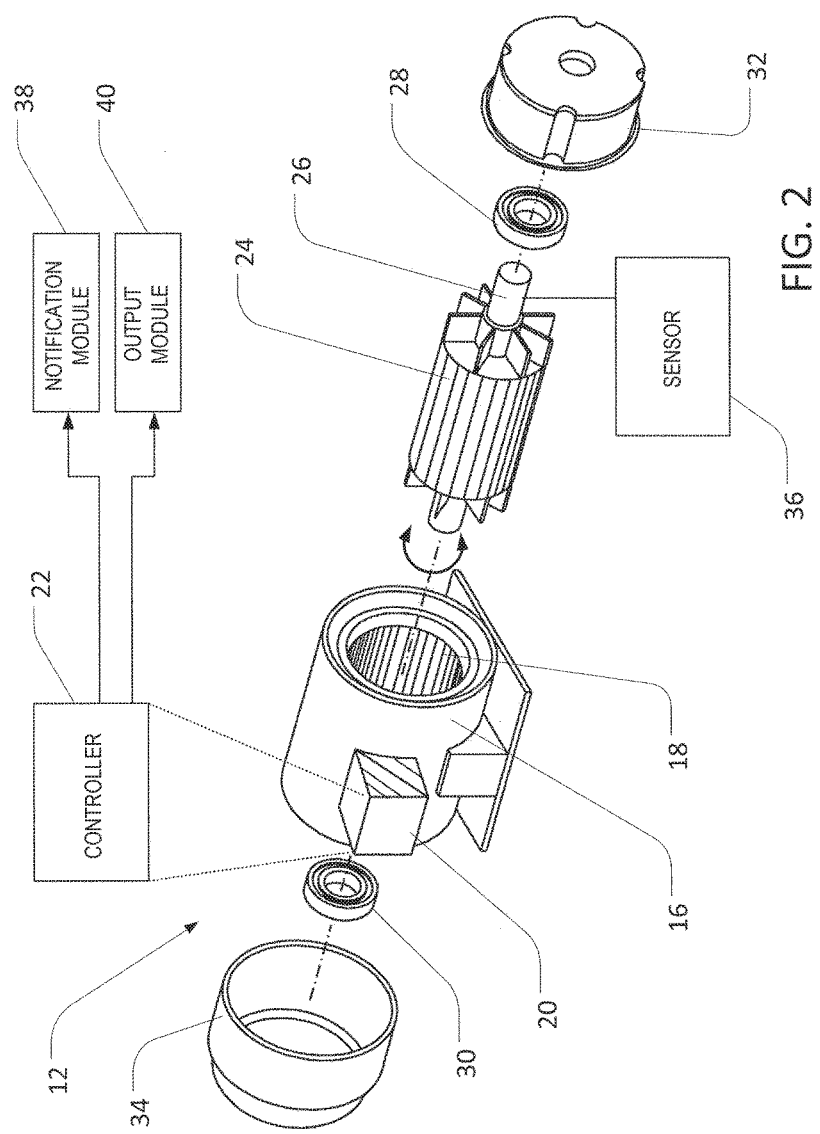
FIG. 2 is an exploded perspective view of the electric motor of FIG. 1, including bearings and a position sensor.

Referring also to FIG. 2, an exploded view of the motor 12 is presented, along with an associated bearing fault detection system. As depicted, the motor 12 includes a main housing 16 containing a stator 18. An electronics box 20 attached to the housing 16 may contain various electronic components, including, for example a controller 22.

The controller 22 may be generally configured to control operation of the motor 12. In various embodiments, the controller 22 may be configured as a computing device with associated processor devices and memory architectures, as a hard-wired computing circuit (or circuits), as a programmable circuit such as a field-programmable gate array ("FPGA"), as a hydraulic, electrical or electro-hydraulic controller, or otherwise. As such, the controller 22 may be configured to execute various computational and control functions with respect to the compact track loader 10 (or other machinery).

In certain embodiments, the controller 22 may be configured to receive input signals in various formats (e.g., as voltage signals or current signals), and to output command signals in various formats (e.g., as voltage signals or current signals).

The controller 22 may be in electronic, mechanical, or other communication with various other systems or devices of the compact track loader 10 (or other machinery). For example, the controller 22 may be in electronic communication with various actuators, sensors, and other devices within (or outside of) the compact track loader 10, including various devices associated with the motor 12. The controller 22 may communicate with other systems or devices (including other controllers) in various known ways, including via wireless communication means. An example location for the controller 22 is depicted in FIGS. 1 and 2. It will be understood, however, that other locations are possible including other locations on the compact track loader 10, or various remote locations.

Still referring to FIG. 2, a rotor 24 of the motor 12 is attached to an output shaft 26 of the motor 12. Generally, the rotor 24 is configured to extend into the housing 16, during operation of the motor 12, such that the rotor 24 is generally surrounded by the stator 18, with end caps 32 and 34 enclosing the rotor 24 and the stator 18. Bearings 28 and 30 are disposed at either end of the shaft 26 and may be seated in the end caps 32 and 34 (or elsewhere) to support the shaft 26 for rotation. It will be recognized, accordingly, that failure of either of the bearings 28 or 30 may render the motor 12 essentially inoperable. Therefore, it may be useful to monitor the motor 12 for indications of expected failure of the bearings 28 and 30. As noted above, such monitoring may be implemented by sensing position data for the shaft 26, during operation of the motor 12.

In order to sense positions of the shaft 26 as the motor 12 operates, a sensor 36 is provided. The sensor 36 is generally in communication with the controller 22 (e.g., via wired or wireless signaling), such that position data from the sensor 36 may be communicated to the controller 22 for further processing. It will be understood that the sensor 36 (or another sensor) may be disposed at various locations with respect to the shaft 26, and may be configured to sense shaft position in various ways.

As depicted, the sensor 36 is arranged to directly sense rotational positions of the shaft 26 as the shaft 26 rotates. For example, the sensor 36 may be configured to directly sense rotational position of the shaft 26 based on detecting the passage (or other movement) of various integral or otherwise attached teeth or similar features on the shaft 26. In other embodiments, the sensor 36 may be configured to measure rotational position of the shaft 26 indirectly, including, for example, by sensing positions of features that rotate with the shaft 26 (e.g., by sensing positions of features of the rotor 24).

In some embodiments, the sensor 36 may be configured as a resolver, such that relatively high-precision position data may be obtained for the shaft 26. For example, the sensor 36 may be configured to sense magnetic coupling between teeth (not shown) rotating with the shaft 26 and stationary teeth (not shown) in order to measure shaft position with relatively high accuracy. In some embodiments, the sensor 36 may be otherwise configured (e.g., as a rotational encoder).

In some implementations, the sensor 36 may be configured to provide position data to the controller 22 for purposes other than identification of an expected bearing failure. For example, the sensor 36 may be configured to sense positions of the shaft 26 and provide associated position data to the controller 22 for control of the operation of the motor 12 (e.g., for speed-based or position-based motor control). In such a case, position data for control of the motor 12 may also be used to identify expected bearing failures, or separate position data may be used for motor control than for bearing monitoring.

During operation of the motor 12, the disclosed system may also operate in order to identify expected failure of one or both of the bearings 28 and 30. For example, position data for the rotating shaft 26, determined based on the sensor 36 sensing positions of the shaft 26, may be communicated to the controller 22. The controller 22 may then analyze the position data in order to identify expected bearing failures.

Generally, the controller 22 may determine a frequency profile based on the position data received from the sensor 36. In some implementations, the controller 22 may determine a frequency profile based on the position data using techniques such as FFT processing. In some implementations, the position data may include (or be converted into) a position profile, including paired values of position and time for the shaft 26. Such a position profile may then be submitted to frequency analysis (e.g., via FFT processing), in order to determine a frequency profile based on the position data.

In some implementations, a velocity profile, including paired values of angular velocity and time for the shaft 26, may be determined based on the position data. For example, the controller 22 may be configured to execute numerical differentiation on received position data in order to determine a velocity profile, over time, for the shaft 26. Frequency analysis may then be conducted (e.g., via FFT processing) for the velocity profile, in order to determine, by way of the velocity profile, a frequency profile based on the position data. In some implementations, use of a velocity profile may eliminate transient or other undesirable frequency effects of the cyclical functioning of many position sensors. For example, where the sensor 36 (e.g., configured as a resolver) denotes the start of each rotation of the shaft 26 as "zero" and the end of each rotation as a maximum value (e.g., 1 or 360), the saw-toothed character of the corresponding position profile may introduce errors into corresponding frequency profiles. By first taking the derivative of the position data, with compensation for the noted saw-tooth, as appropriate, some of these errors may be avoided.

In some implementations, other processing of position data may be possible. In some implementations, for example, position data may be unwrapped before a frequency profile is determined. Due to the unwrapping, certain spectral noise from the position data may accordingly be removed before expected bearing failures are determined. For example, where the position sensor 36 denotes the start of each rotation of the shaft 26 as "zero," an offset of 360 (or a similar value indicating a single rotation) may be added to the position data that follows a first full rotation of the shaft 26. Similarly, an offset of 720 (or a similar value indicating two rotations) may be added to the position data that follows a second full rotation of the shaft 26, and so on. Accordingly, unwrapped position data may exhibit a generally increasing profile (with oscillations around an increasing baseline profile), rather than a saw-toothed profile that generally increase over each revolution of the shaft 26 before returning to zero. Once the position data has been unwrapped, a frequency profile may then be determined, and possible bearing failures identified, according to various operations described herein.

In some implementations, detrending may be applied to the position data, including after a prior unwrapping operation. Due to the detrending, similar to the unwrapping noted above, certain spectral noise from the position data may be removed before expected bearing failures are determined. For example, where position data exhibits a generally ramp-like profile, an average speed over a relevant sample period may be determined and the position data reduced accordingly. As such, for example, detrended position data may be represented by a signal with a base value of zero, with deviations around the base value indicating deviations from steady rotation of the shaft 26. Once the position data has been detrended, a frequency profile may then be determined, and possible bearing failures identified, according to various operations described herein.

Once a frequency profile has been determined, the controller 22 may identify one or more characteristics of the frequency profile. In some implementations, a characteristic of a frequency profile may include a frequency peak. For example, the controller 22 may identify one or more frequency peaks of the frequency profile, as indicated by a local maximum frequency amplitude or by a band of frequencies with relatively elevated amplitudes. In other implementations, other characteristics may also (or alternatively) be possible.

Based upon the identified characteristics, the controller 22 may then identify whether a bearing failure is expected. In some implementations, this may be based upon comparing a characteristic of a frequency profile, with a predetermined frequency (as included, for example, in a predetermined frequency band). Where, for example, a predetermined frequency for the system of FIG. 2 is a failure mode frequency (i.e., a frequency or band of frequencies that is generally indicative of a likely failure of a bearing), a peak (e.g., a local maximum or band of elevated amplitude) of the frequency profile that corresponds with (e.g., is approximately equal to) the predetermined frequency may indicate a likely failure of one of the bearings 28 and 30. As such, the controller 22 may identify that a bearing failure is expected.

In some implementations, the controller 22 may identify expected bearing failures based upon comparing a characteristic of a frequency profile with solutions to a relevant equation for the system of FIG. 2. A characteristic failure frequency equation, for example, accounting for various characteristics of the motor 12, one or more of the bearings 28 and 30, and other components and devices, may exhibit solutions corresponding to particular failure mode frequencies for the system of FIG. 2. Accordingly, frequency profiles with peaks (e.g., local maxima or frequency bands) corresponding to solutions to the characteristic failure frequency equation may indicate a likely failure of one of the bearings 28 and 30. As such, the controller 22 may identify that a bearing failure is expected.

In some implementations, the controller 22 may be configured to solve a characteristic failure frequency equation on demand, as may be useful, for example, to ensure that the solutions appropriately reflect actual system settings (e.g., current operating speeds for the motor 12). In some implementations, the controller 22 may access predetermined solutions to such an equation (e.g., via a look-up table) for comparison with the relevant frequency profile, or various characteristics thereof.

In some implementations, as also noted above, the controller 22 may determine a velocity profile based on the received position data, determine a frequency profile based on the velocity profile, and analyze the velocity-based frequency profile, rather than a position-based frequency profile, for indications of expected bearing failure. In such cases, once a velocity-based frequency profile has been determined (e.g., via FFT processing), frequency analysis to identify expected bearing failures may otherwise proceed similarly to the operations described above for position-based frequency profiles. For example, the controller 22 may compare characteristics of the velocity-based frequency profile with predetermined frequencies (e.g., predetermined failure mode frequencies) or solutions to an appropriate equation (e.g., solutions to a characteristic failure frequency equation), in order to identify expected bearing failures.

In some implementations, the controller 22 may compare a characteristic of a frequency profile to a reference value (e.g., a predetermined failure mode frequency or a solution to a characteristic failure frequency equation) as part of comparing a larger portion of the frequency profile with the reference value. For example, an entire frequency profile (or large portions thereof), including various frequency peaks, may be compared with reference values corresponding to expected bearing failure. In some implementations, the controller 22 may compare only selected characteristics of a frequency profile with reference values. For example, rather than analyzing an entire frequency profile, the controller 22 may simply compare the frequency (and, potentially, amplitude) of any peaks of the frequency profile with known failure mode frequencies for the system. In other implementations, other approaches may also (or alternatively) be used.

In some implementations, when an expected bearing failure is identified, a corresponding indication may be provided by the controller 22 to various other devices, modules, or systems. For example, as depicted in FIG. 2, the controller 22 may communicate indications of expected bearing failures to a notification module 38 or to a output module 40. The notification module 38 may be configured to relay the notification, or related signals, to various other devices, systems or modules, such as a control module (not shown) for the motor 12 or other systems of the loader 10. This may be useful, for example, in order to control various aspects of operation of the loader 10 based upon the expected bearing failure. The output module 40 may be configured to relay the notification, or related signals, to devices such as a display screen 42 (see FIG. 1) of the loader 10, or a similar output device configured to provide a notification to an operator (e.g., a light panel, audio device, touchscreen, and so on). This may be useful, for example, in order to alert an operator to the expected bearing failure, in order to allow for timely scheduling of maintenance or other actions.

In some implementations, as noted above, an expected bearing failure may be identified based upon comparing a frequency profile (or portion thereof) with one or more predetermined (or calculated) failure mode frequencies. As also noted above, failure mode frequencies generally represent particular frequencies that may be indicative of an expected bearing failure. Accordingly, if a frequency profile that is determined based on shaft position data exhibits an frequency peak (e.g., local maximum or frequency band with elevated amplitude) corresponding to a failure mode frequency, an expected bearing failure may be identified.

Figure 3:
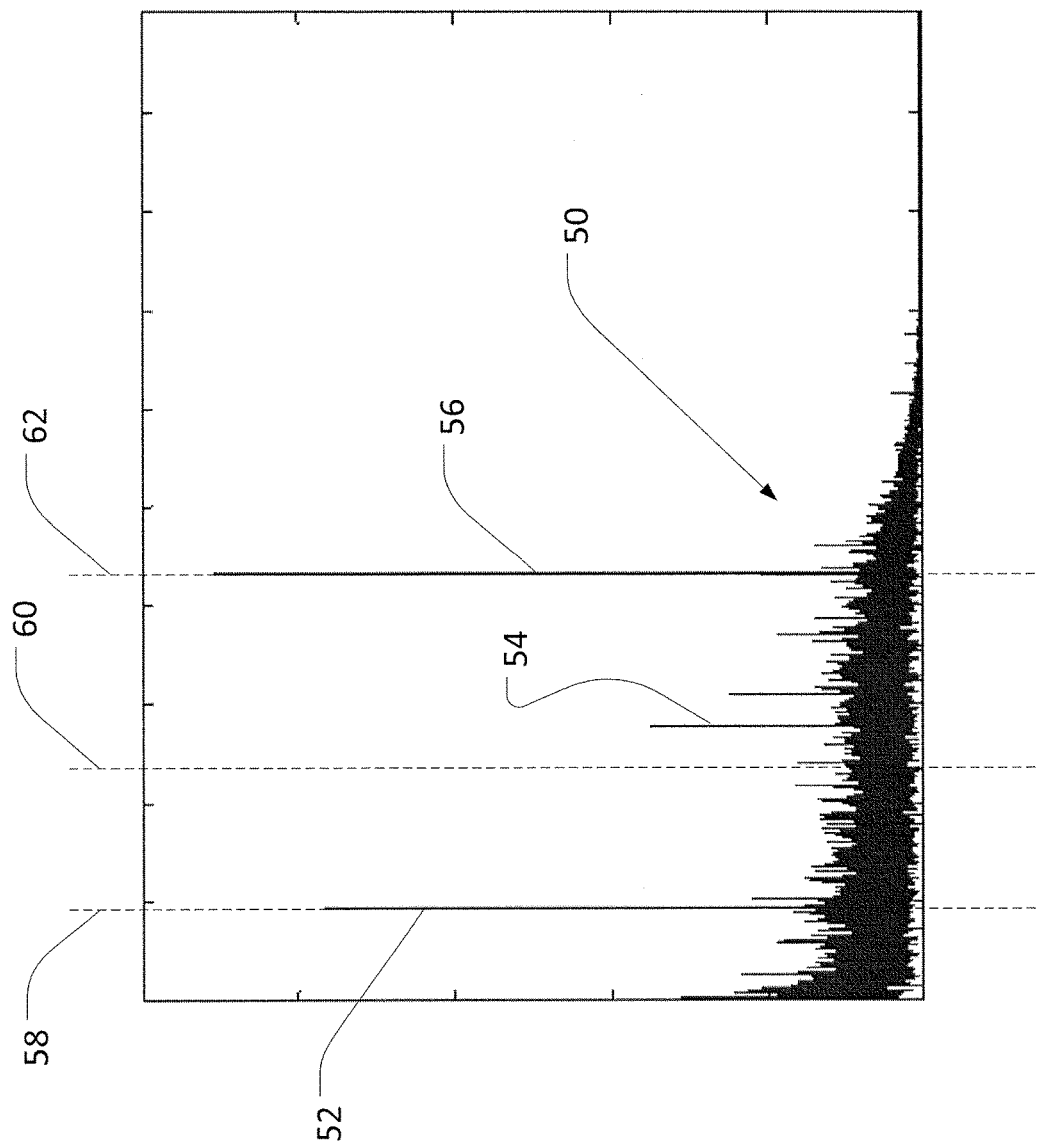
FIG. 3 is a graphical representation of a frequency profile based on position data from operation of the electric motor of FIG. 1.

Referring also to FIG. 3, for example, a frequency profile 50 may be determined based on position data for the shaft 26, as provided by the sensor 36. Generally, the abscissa values of the profile 50 indicate particular frequencies present in the profile 50, with ordinate values of the profile 50 indicating amplitudes corresponding to those frequencies.

As depicted, the profile 50 has been determined based directly on position data for the shaft 26. In other implementations, the profile 50 may alternatively be determined based upon a velocity profile, which may itself be determined based upon the position data for the shaft 26.

As depicted in FIG. 3, the frequency profile 50 includes a number of frequency peaks, including frequency peaks 52, 54, and 56 exhibiting local maxima of relatively large amplitudes. Further, for the arrangement and operating conditions (e.g., operational velocity) that result in the frequency profile 50, a number of predetermined (or calculated) failure mode frequencies 58, 60, and 62 have been identified.

By comparing the frequency profile 50 (or the frequency peaks 52, 54, and 56) with the failure mode frequencies 58, 60, and 62, it can be determined that the frequencies of the frequency peaks 52 and 56 generally correspond to the failure mode frequencies 58 and 62. It can also be determined that the frequency of the frequency peak 54 generally does not correspond with the failure mode frequency 60. For example, the frequency peak 54 may result from a gear box (not shown) attached to the motor 12, or other system dynamics not directly related to bearing failure. Accordingly, an expected bearing failure may be identified based upon the presence of the frequency peaks 52 and 56 in the frequency profile 50.

In some implementations, additional information regarding the expected bearing failure may be identified based on the noted frequency analysis. For example, the correspondence of the frequency peaks 52 and 56, but not the frequency peak 54, to determined failure mode frequencies may indicate that a bearing failure of a particular type (e.g., failure of a particular component of the bearing) may be likely. In some implementations, this information may be provided to an operator (e.g., via the output module 40 and the display screen 42), or may be otherwise used (e.g., to control various aspects of operation of the motor 12).

In some implementations, amplitude information from a frequency profile may also be used (e.g., in addition to frequency values of profile peaks) to identify expected bearing failures. For example, even where a frequency peak of a frequency profile corresponds to a failure mode frequency, an expected bearing failure may sometimes not be identified unless an amplitude of the frequency peak exceeds a predetermined reference amplitude. This may be useful, for example, in order to ensure that bearing failure is sufficiently likely to justify remedial action, or to ensure that contributions of non-bearing system components do not result in false identification of expected bearing failure.

Figure 4:
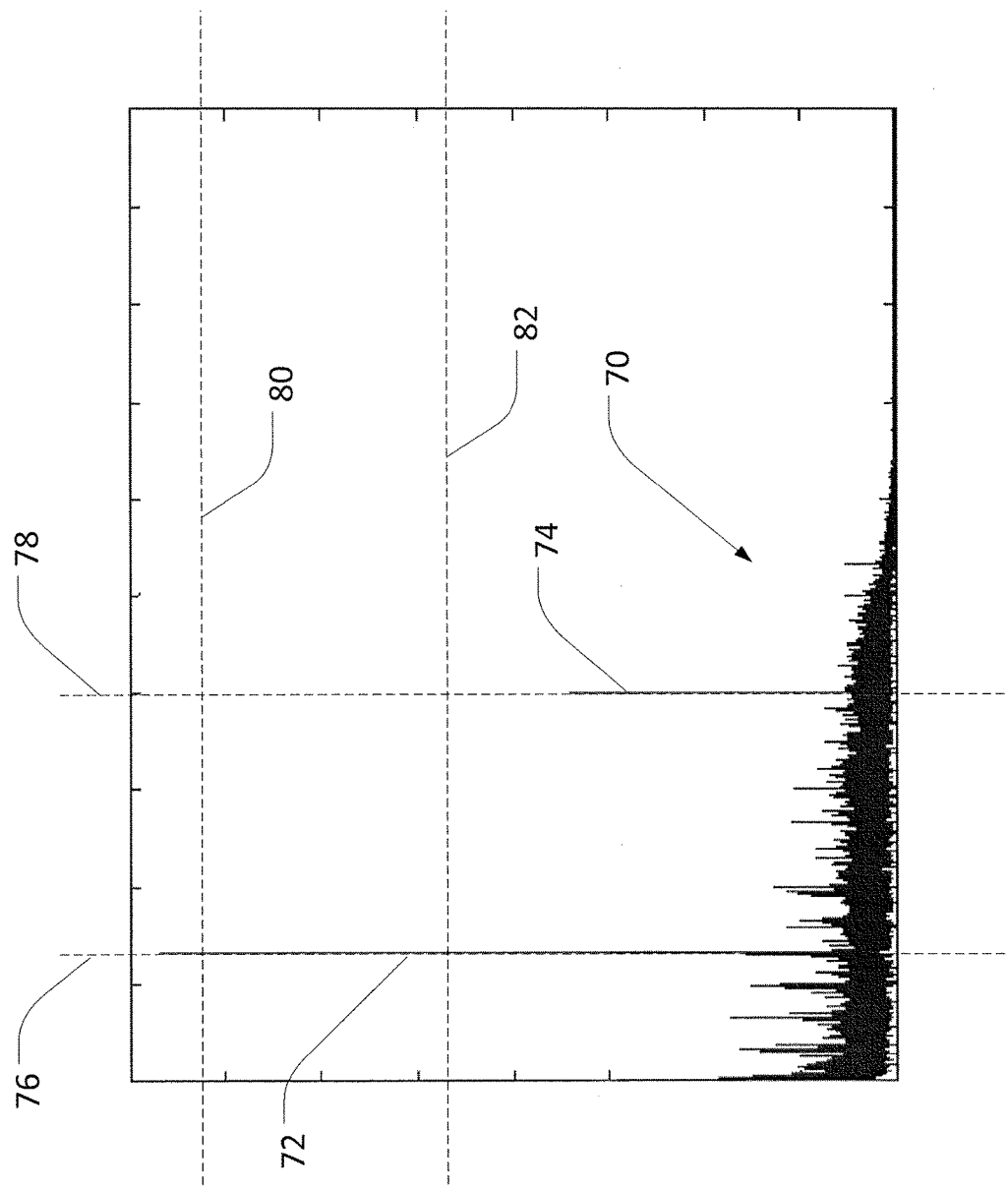
FIG. 4 is a graphical representation of another frequency profile based on position data from operation of the electric motor of FIG. 1.

Referring also to FIG. 4, for example, a frequency profile 70 may be determined based on position data for the shaft 26, as provided by the sensor 36. As depicted, the frequency profile 70 may reflect different operating conditions (e.g., different operating speeds for the motor 12) than the frequency profile 50 (see FIG. 3). Accordingly, as can be seen in FIG. 4, the profile 70 may differ from the profile 50 in various ways. As with the profile 50, however, the abscissa values of the profile 70 generally indicate particular frequencies present in the profile 70, with ordinate values of the profile 70 indicating amplitudes corresponding to those frequencies.

As depicted, the profile 70 has been determined based directly on position data for the shaft 26. In other implementations, the profile 70 may alternatively be determined based upon a velocity profile, which may itself be determined based upon the position data for the shaft 26.

As depicted in FIG. 4, the frequency profile 70 includes a number of frequency peaks, including frequency peaks 72 and 74 exhibiting local maxima of relatively large amplitudes. For the arrangement and operating conditions (e.g., operational velocity) that result in the frequency profile 70, predetermined (or calculated) failure mode frequencies 76 and 78 have been identified. Further, for each failure mode frequency 76 and 78, a corresponding failure mode amplitude 80 and 82 has also been determined. Generally, the failure mode amplitudes 80 and 82 may indicate, respectively, amplitudes for the failure mode frequencies 76 and 78 that correspond to an elevated risk of bearing failure.

Accordingly, by comparing the frequency profile 70 (or the frequency peaks 72 and 74) with the failure mode frequencies 76 and 78, it can be determined that the frequencies of the frequency peaks 72 and 74 generally correspond to the failure mode frequencies 76 and 78. However, it can also be determined that the amplitude of the frequency peak 74 does not exceed the corresponding failure mode amplitude 82, while the amplitude of the frequency peak 72 does exceed the corresponding failure mode amplitude 80. Accordingly, an expected bearing failure may be identified based upon the presence of the frequency peak 72 in the frequency profile 70, but not necessarily based upon the presence of the frequency peak 74.

In some implementations, analyzing a frequency profile to identify expected bearing failures may include comparing a frequency profile (or portion thereof) with a predetermined or calculated failure mode frequency that is included in a frequency band. For example, it may be determined that elevated amplitudes of a frequency profile within a particular band of frequencies may correspond to an expected bearing failure. Accordingly, a frequency profile (or a portion thereof) may be analyzed to identify any frequency peaks that are included, at least in part, within the identified band.

Figure 5:
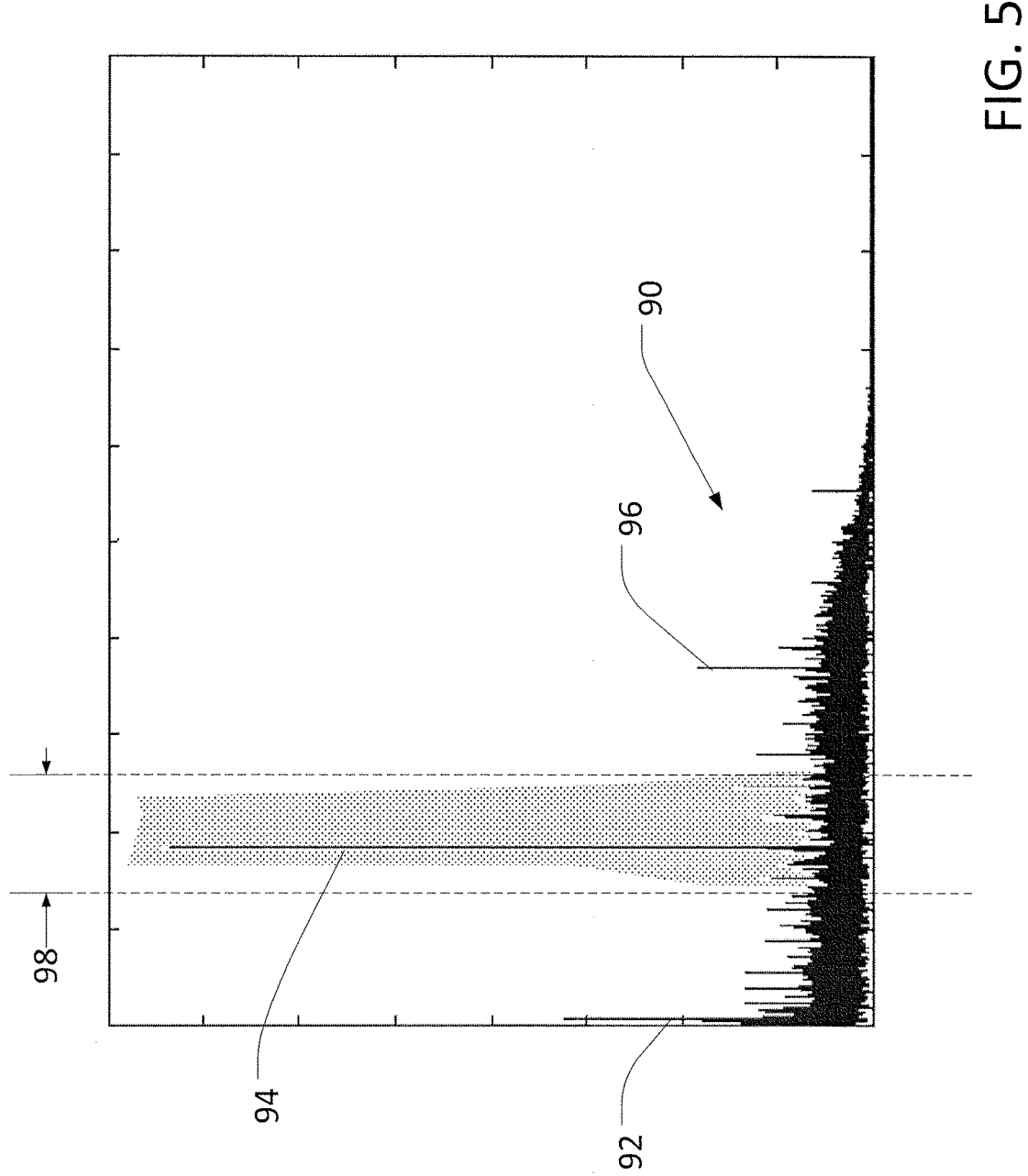
FIG. 5 is a graphical representation of yet another frequency profile based on position data from operation of the electric motor of FIG. 1.

Referring also to FIG. 5, for example, a frequency profile 90 may be determined based on position data for the shaft 26, as provided by the sensor 36. As depicted, the frequency profile 90 may reflect different operating conditions (e.g., different operating speeds for the motor 12) than the frequency profiles 50 and 70 (see FIGS. 3 and 4). Accordingly, as can be seen in FIG. 5, the profile 90 may differ from the profiles 50 and 70 in various ways. As with the profiles 50 and 70, however, the abscissa values of the profile 90 generally indicate particular frequencies present in the profile 90, with ordinate values of the profile 90 indicating the amplitudes corresponding to those frequencies.

As depicted, the profile 90 has been determined based directly on position data for the shaft 26. In other implementations, the profile 90 may alternatively be determined based upon a velocity profile, which may itself be determined based upon the position data for the shaft 26.

As depicted in FIG. 5, the frequency profile 90 includes a number of frequency peaks, including frequency peaks 92, 94, and 96 exhibiting local maxima of relatively large amplitudes. For the arrangement and operating conditions (e.g., operational velocity) that result in the frequency profile 90, predetermined (or calculated) failure mode frequencies have been identified that generally span a failure mode frequency band 98. As depicted by shading of the band 98 in FIG. 5, different frequencies in the frequency band 98 may correspond to different amplitudes, such that the frequency band 98 defines not only a range of frequencies, but a corresponding range of reference amplitudes. By comparing the frequency profile 90 (or the frequency peaks 92, 94 and 96) with the failure mode frequency band 98 (or portions thereof), it may be determined that the frequency of the frequency peak 94 generally corresponds to the failure mode frequencies of the frequency band 98, while the frequencies of the frequency peaks 94 and 96 do not. Accordingly, an expected bearing failure may be identified based upon the presence (and, potentially, the amplitude) of the frequency peak 94 in the frequency profile 90, but not necessarily based upon the presence (or amplitude) of the frequency peaks 92 and 96.

As noted above, it may sometimes be useful to determine a frequency profile based on a velocity profile for a particular system, rather than directly based on a position profile. For example, position data from a position sensor may be received and a position profile determined to be essentially identical to the received position data, as paired with corresponding time indicators. A derivative of the position profile may be taken, such that a velocity profile may be determined based on the position data. A frequency profile may then be determined based upon the velocity profile, and the frequency profile analyzed to identify any expected bearing failure.

As also noted above, the use of a velocity profile, based on sensed position data, may usefully allow for the elimination of frequency artifacts that may not relate to an expected bearing failure. For example, frequency artifacts resulting from a saw-toothed profile of a position profile may be generally eliminated through determination of an associated velocity profile. Accordingly, when a frequency profile is derived from the velocity profile, these artifacts may not appear (or may appear with reduced magnitude), such that a more accurate assessment of bearing health may be obtained.

Figure 6A:
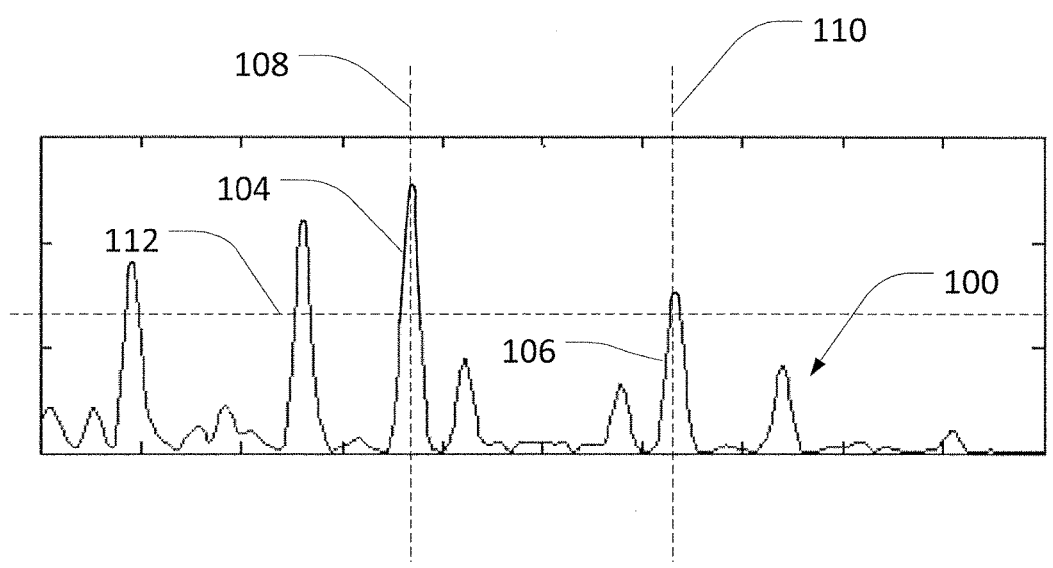
FIGS. 6A and 6B are complementary frequency profiles from operation of the electric motor of FIG. 1, as determined based on position and velocity profiles, respectively.
Figure 6B:
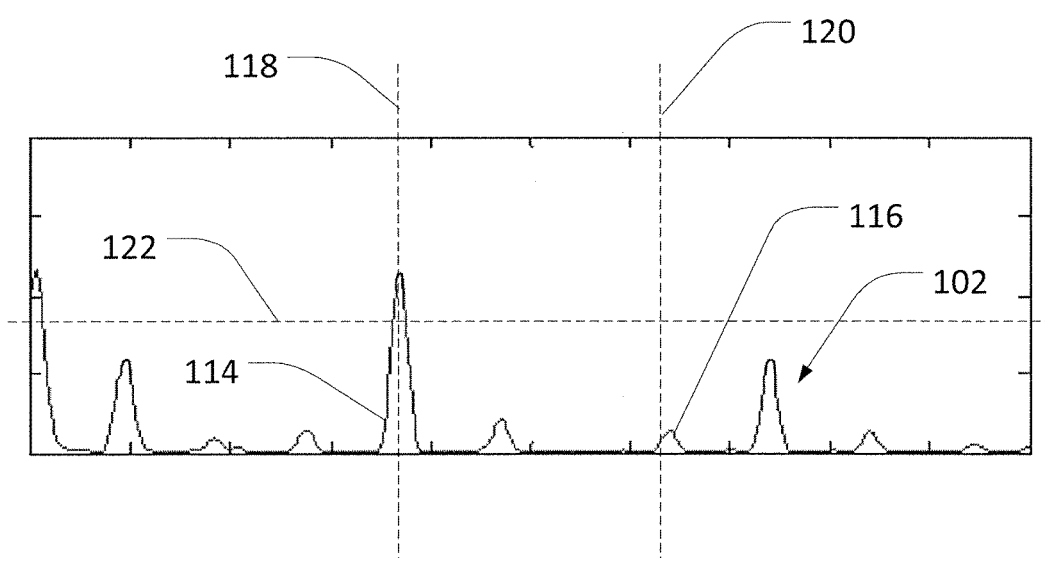

Referring also to FIGS. 6A and 6B, a frequency profile 100 may be determined based on position data for the shaft 26, as provided by the sensor 36, where the frequency profile 100 is determined from frequency analysis (e.g., FFT processing) of a position profile derived from the position data. In contrast, a frequency profile 102 may be determined based upon frequency analysis (e.g., FFT processing) of a velocity profile derived from the position profile underlying the frequency profile 100. As depicted, the frequency profiles 100 and 102 may reflect different operating conditions (e.g., different operating speeds for the motor 12) than the frequency profiles 50, 70, and 90 (see FIGS. 3 through 5). Accordingly, as can be seen in FIGS. 6A and 6B, the profiles 100 and 102 may differ from the profiles 50, 70, and 90 in various ways. As with the profiles 50, 70 and 90, however, the abscissa values of the profiles 100 and 102 generally indicate particular frequencies present in the respective profiles 100 and 102, with ordinate values indicating the amplitudes corresponding to those frequencies.

As depicted in FIG. 6A, the frequency profile 100 includes a number of frequency peaks, including frequency peaks 104 and 106 exhibiting local maxima of relatively large amplitudes. For the arrangement and operating conditions (e.g., operational velocity) that result in the frequency profile 100, predetermined (or calculated) failure mode frequencies 108 and 110 have been identified. Further, for both of the failure mode frequencies 108 and 110, a corresponding shared failure mode amplitude 112 (for a position-based frequency profile) has also been determined. Generally, the failure mode amplitude 112 may indicate an amplitude for the failure mode frequencies 108 and 110 that corresponds to an elevated risk of bearing failure.

Accordingly, by comparing the frequency profile 100 (or the frequency peaks 104 and 106) with the failure mode frequencies 108 and 110, it can be determined that the frequencies of the frequency peaks 104 and 106 generally correspond to the failure mode frequencies 108 and 110. It can also be determined that the amplitudes of the frequency peaks 104 and 106 exceed the corresponding failure mode amplitude 112. Accordingly, an expected bearing failure may be identified based upon the presence of the frequency peaks 104 and 106 in the frequency profile 100.

For certain systems or certain operations, however, one or both of the frequency peaks 104 and 106 (or contributions thereto) may result from system dynamics and characteristics that are not directly related to an expected bearing failure. In some implementations, determining a frequency profile based on a velocity profile (itself determined based on a position profile) may help to remove artifacts relating to these dynamics and characteristics. As depicted in FIG. 6B, for example, the frequency profile 102 includes frequency peaks 114 and 116 that correspond to local maxima of the frequency profile 102. Generally, the frequency peaks 114 and 116 may exhibit, respectively, the frequencies of the frequency peaks 104 and 106 of FIG. 6A. While the frequency peak 114 exhibits a relatively large amplitude, however, the frequency peak 116 exhibits a relatively small amplitude. This may result, for example, from a derivative operation executed to convert the position profile underlying the frequency profile 100 of FIG. 6A to the velocity profile underlying the frequency profile 102 of FIG. 6B.

For the arrangement and operating conditions (e.g., operational velocity) that result in the frequency profile 102, predetermined (or calculated) failure mode frequencies 118 and 120 have been identified, with frequencies that are generally similar to the failure mode frequencies 108 and 110 of FIG. 6A. Further, for both of the failure mode frequencies 118 and 120, a corresponding shared failure mode amplitude 122 (for a velocity-based frequency profile) has also been determined. Generally, the failure mode amplitude 122 may indicate an amplitude for the failure mode frequencies 118 and 120 that corresponds to an elevated risk of bearing failure.

Accordingly, by comparing the frequency profile 102 (or the frequency peaks 114 and 116) with the failure mode frequencies 118 and 120, it can be determined that the frequencies of the frequency peaks 114 and 116 generally correspond to the failure mode frequencies 118 and 120. It can also be determined that while the amplitude of the frequency peak 114 exceeds the corresponding failure mode amplitude 112, the amplitude of the frequency peak 116 does not exceed the failure mode amplitude 112. Accordingly, an expected bearing failure may be identified based upon the presence of the frequency peak 114 in the frequency profile 100, but not based upon the presence of the frequency peak 116. In this way, for example, it can be seen that use of a velocity-based frequency profile may help to eliminate false positive identification of expected bearing failure that might result from use of a position-based frequency profile. It will be understood, however, that the use of position-based frequency profiles may also be advantageous and may be preferable in various implementations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A fault detection system for predicting bearing failure, in a system having an electric machine with a bearing-supported shaft, the fault detection system comprising:
   a position sensor configured to sense positions of the shaft as the shaft rotates; and
   a controller configured to:
      receive position data from the position sensor, the position data indicating a plurality of sensed positions of the shaft;
      determine at least one of a position profile and a velocity profile over time for the shaft, based upon the received position data;
      determine a frequency profile for the at least one of the position profile and the velocity profile;
      identify a frequency peak in the frequency profile including identifying a frequency band in the frequency profile; and
      identify an expected bearing failure based upon:
         at least one of comparing the frequency peak with one or more solutions to a characteristic failure frequency equation for a bearing supporting the shaft, and comparing the frequency peak with one or more predetermined failure mode frequencies;
         determining that the frequency peak exhibits an amplitude exceeding a predetermined failure mode amplitude; and
         determining that the frequency peak is within the frequency band.

2. The fault detection system of claim 1, wherein the position sensor is configured as a resolver.

3. A fault detection system for predicting bearing failure, in a system having a bearing-supported shaft, the fault detection system comprising:
   a position sensor configured to sense positions of the shaft as the shaft rotates; and
   a controller configured to:
      receive position data from the position sensor, the position data indicating a plurality of sensed positions of the shaft;
      determine at least one of a position profile and a velocity profile over time for the shaft, based upon the received position data;
      determine a frequency profile for at least one of the position profile and the velocity profile;
      identify a frequency peak in the frequency profile and one or more characteristics of the frequency profile across a frequency band; and
      identify an expected bearing failure based upon the identified frequency peak and the one or more characteristics of the frequency profile across the frequency band.

4. The fault detection system of claim 3, wherein the shaft is included in an electric motor configured to power an operation of a work vehicle, with a rotor of the electric motor mounted to the shaft.

5. The fault detection system of claim 3, wherein the controller is further configured to communicate an indicator of the expected bearing failure to at least one of an output module and a notification module.

6. The fault detection system of claim 3, wherein the position sensor is configured as one of a resolver and an encoder.

7. The fault detection system of claim 3, wherein the controller is configured to identify the expected bearing failure based upon at least one of comparing the frequency peak with one or more solutions to a characteristic failure frequency equation for a bearing supporting the shaft, and comparing the frequency peak with one or more predetermined failure mode frequencies.

8. The fault detection system of claim 3, wherein the controller is configured to identify the expected bearing failure based upon determining that the identified frequency peak exhibits an amplitude exceeding a predetermined failure mode amplitude.

9. A fault detection system for predicting bearing failure, in a system having a bearing-supported shaft, the fault detection system comprising:
a position sensor configured to sense positions of the shaft as the shaft rotates; and
a controller configured to:
receive position data from the position sensor, the position data indicating a plurality of sensed positions of the shaft;
determine a frequency profile based upon the received position data;
identify a first characteristic of the frequency profile across a frequency band of the frequency profile; and
identify an expected bearing failure based upon the identified first characteristic within the frequency band.

10. The fault detection system of claim 9, wherein the controller is further configured to communicate an indication of the expected bearing failure to at least one of an output module and a notification module.

11. The fault detection system of claim 9, wherein the position sensor is configured as one of a resolver and an encoder.

12. The fault detection system of claim 9, wherein the controller is configured to determine the frequency profile based upon determining a velocity profile for the shaft based upon the position data.

13. The fault detection system of claim 9, wherein the controller is configured to identify the expected bearing failure based upon comparing the first characteristic of the frequency profile with one or more solutions to a characteristic failure frequency equation for a bearing supporting the shaft.

14. The fault detection system of claim 9, wherein the controller is configured to identify the expected bearing failure based upon comparing the first characteristic of the frequency profile with one or more predetermined frequencies.

15. The fault detection system of claim 9, wherein the controller is configured to identify the expected bearing failure based upon the controller identifying a frequency peak as the first characteristic.

16. The fault detection system of claim 15, wherein the controller is configured to identify the expected bearing failure based upon determining that the frequency peak exhibits an amplitude exceeding a predetermined amplitude.

* * * * *